(12) United States Patent
Nishikawa et al.

(10) Patent No.: US 10,680,256 B2
(45) Date of Patent: Jun. 9, 2020

(54) SEALING MEMBER FOR A FUEL CELL

(71) Applicant: SUMITOMO RIKO COMPANY LIMITED, Komaki-shi, Aichi (JP)

(72) Inventors: Yusuke Nishikawa, Komaki (JP); Kenji Yamamoto, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 21 days.

(21) Appl. No.: 15/294,309

(22) Filed: Oct. 14, 2016

(65) Prior Publication Data

US 2017/0288237 A1 Oct. 5, 2017

(30) Foreign Application Priority Data

Mar. 31, 2016 (JP) .................................. 2016-070946
Oct. 14, 2016 (JP) .................................. 2016-202451

(51) Int. Cl.
 *C08K 5/09* (2006.01)
 *H01M 8/0284* (2016.01)
 (Continued)

(52) U.S. Cl.
 CPC ........... *H01M 8/0284* (2013.01); *C08K 5/098* (2013.01); *C08K 5/14* (2013.01); *C08L 23/16* (2013.01);
 (Continued)

(58) Field of Classification Search
 CPC ............. H01M 8/0284; H01M 8/0273; H01M 2008/1095; C08K 5/098; C08K 5/101; C08L 23/08; C08L 2205/02
 (Continued)

(56) References Cited

U.S. PATENT DOCUMENTS 4,547,554 A * 10/1985 Kadomatsu ............... C08F 8/22
 525/334.1
5,773,515 A * 6/1998 Srinivasan .............. C08L 23/12
 524/451
(Continued)

FOREIGN PATENT DOCUMENTS

CA 2 508 177 A1 11/2006
CN 103570878 A 2/2014
(Continued)

OTHER PUBLICATIONS

Machine Translation for JP 2009-094056, Apr. 30, 2009.*
(Continued)

*Primary Examiner* — Michael A Salvitti
(74) *Attorney, Agent, or Firm* — Westerman, Hattori, Daniels & Adrian, LLP (57) ABSTRACT

Provided is a sealing member for a fuel cell, including a constituent member of a fuel cell and the sealing member bonded to each other through intermediation of an adhesive layer, or including the sealing members bonded to each other through intermediation of the adhesive layer, the sealing member including a cross-linked product of a rubber composition, in which the rubber composition contains the following components (A) to (C): (A) at least one rubber component selected from the group consisting of an ethylene-propylene rubber, an ethylene-propylene-diene rubber, and an ethylene-butene-diene rubber; (B) a cross-linking agent including an organic peroxide; and (C) at least one of a fatty acid potassium or a fatty acid sodium.

10 Claims, 2 Drawing Sheets

(51) Int. Cl.
- *C08L 91/06* (2006.01)
- *C08L 23/16* (2006.01)
- *C08K 5/14* (2006.01)
- *C08K 5/098* (2006.01)
- *H01M 8/0273* (2016.01)
- *H01M 8/1018* (2016.01)

(52) U.S. Cl.
CPC ........... *C08L 91/06* (2013.01); *H01M 8/0273* (2013.01); *H01M 2008/1095* (2013.01)

(58) Field of Classification Search
USPC ........................................................ 524/399
See application file for complete search history.

(56) References Cited

U.S. PATENT DOCUMENTS

| | | | |
|---|---|---|---|
| 9,543,596 B2* | 1/2017 | Yamamoto | H01M 8/0271 |
| 2007/0088128 A1* | 4/2007 | Minagoshi | B65H 27/00 |
| | | | 525/192 |
| 2008/0188621 A1* | 8/2008 | Ichino | B60C 1/0016 |
| | | | 525/232 |
| 2009/0005279 A1* | 1/2009 | Wu | C08F 10/14 |
| | | | 508/591 |
| 2009/0099293 A1* | 4/2009 | Morioka | C08K 3/0058 |
| | | | 524/436 |
| 2013/0137814 A1* | 5/2013 | Nakano | C08L 33/10 |
| | | | 524/523 |
| 2013/0157173 A1* | 6/2013 | Yamamoto | H01M 8/0284 |
| | | | 429/510 |
| 2015/0288004 A1* | 10/2015 | Yamamoto | C08L 23/16 |
| | | | 429/480 |
| 2017/0288237 A1* | 10/2017 | Nishikawa | C08K 5/098 |
| 2017/0342240 A1* | 11/2017 | Natarajan | C08L 9/00 |

FOREIGN PATENT DOCUMENTS

| | | |
|---|---|---|
| CN | 104448664 A | 3/2015 |
| DE | 10 2016 209 098 A1 | 11/2017 |
| JP | 2009-94056 A | 4/2009 |
| JP | 2010-146781 A | 7/2010 |

OTHER PUBLICATIONS

Typical Properties Characteristics of JSR EP Chart, no date.*
Office Action dated Feb. 6, 2018, issued in counterpart German Application No. 102016012405.9, with English translation. (10 pages).

* cited by examiner

FIG. 1

SEALING MEMBER FOR A FUEL CELL

BACKGROUND

1. Field of the Invention

The present disclosure relates to a sealing member for a fuel cell to be used for sealing a constituent member of a fuel cell.

2. Description of the Related Art

Fuel cells generate electricity through an electrochemical reaction of gases, exhibit high power generation efficiency, and have an extremely small influence on the environment by virtue of discharging a clean gas. Of the fuel cells, a polymer electrolyte fuel cell can be operated at a relatively low temperature and has a high power density. Therefore, the polymer electrolyte fuel cell is expected to be used in various applications, such as a power source for power generation and a power source for an automobile.

The polymer electrolyte fuel cell includes as a power generation unit a cell including separators and a membrane electrode assembly (MEA) or the like sandwiched between the separators. The MEA is formed of a polymer membrane (electrolyte membrane) serving as an electrolyte and a pair of electrode catalyst layers (a fuel electrode (anode) catalyst layer and an oxygen electrode (cathode) catalyst layer) arranged on both surfaces of the electrolyte membrane in its thickness direction. Further, a porous layer for diffusing a gas is arranged on each of surfaces of the pair of electrode catalyst layers. A fuel gas, such as hydrogen, is supplied to a fuel electrode side, and an oxidant gas, such as oxygen or air, is supplied to an oxygen electrode side. Power is generated through an electrochemical reaction at a three-phase interface between the supplied gas, the electrolyte, and the electrode catalyst layer. The polymer electrolyte fuel cell is constructed by securing a cell stack, in which a plurality of the cells are stacked, with end plates or the like arranged on the top cell and the bottom cell of the cell stack in a cell stacking direction.

The separators each include a flow passage for the gas to be supplied to each of the electrodes and a flow passage for a cooling medium for alleviating heat to be generated during the power generation. For example, when the gases to be supplied to the respective electrodes are mixed with each other, there occurs a problem such as a reduction in power generation efficiency. In addition, the electrolyte membrane exhibits proton conductivity in a state of containing water. Accordingly, it is necessary to keep the electrolyte membrane in a wet state at the time of operation. Therefore, in order to prevent the gases from being mixed with each other, prevent leakage of the gases and cooling medium, and keep an inside of the cell in a wet state, it is important to ensure a sealing property at a periphery of the MEA and porous layers or a sealing property between the separators adjacent to each other. As a sealing member for sealing such constituent member, there has been proposed, for example, a sealing member (rubber gasket) formed of an ethylene-propylene-diene terpolymer rubber (EPDM), an ethylene-propylene copolymer rubber (EPM), or the like (see JP-A-2009-94056 and JP-A-2010-146781).

SUMMARY OF THE INVENTION

Incidentally, when sulfur is used as a cross-linking agent in a rubber composition serving as a material for the sealing member for a fuel cell as described above, there is a risk in that power generation of the fuel cell may be inhibited. Accordingly, an organic peroxide is generally used as the cross-linking agent in the rubber composition. However, unlike sulfur, the organic peroxide has a property of decomposing a rubber into a low-molecular-weight product. In addition, the low-molecular-weight rubber decomposed as described above is liable to adhere to the surface of a mold (inner peripheral surface of the mold) during mold molding of the sealing member for a fuel cell, resulting in a problem such as causing mold contamination.

A possible solution to the problem of mold contamination as described above is, for example, to apply a release agent onto the surface of the mold. However, the mold molding of the sealing member for a fuel cell is desirably performed without any use of the release agent (or with low releasability) in order not to adversely affect the power generation property of the fuel cell, the adhesiveness of the sealing member, or the dimensional accuracy of the sealing member.

Meanwhile, there have also been investigations on the addition of a compound having a property of enhancing mold releasability into the rubber composition serving as the material for the sealing member for a fuel cell. However, sufficient investigations have yet to be made on a compound capable of improving mold releasability while maintaining mechanical properties (e.g., tensile strength and elongation at break) and settling resistance required of the sealing member for a fuel cell. Further, the compound showing a property of enhancing mold releasability is liable to undergo bleedout, and hence is liable to serve as a factor in impairing the adhesiveness of the sealing member. That is, such compound has a risk of causing a failure in the integration of the sealing member with a member such as a separator (constituent member of a fuel cell) by vulcanization bonding or subsequent bonding of the sealing member through intermediation of an adhesive layer. Therefore, there is still room for improvement in investigating the addition of the compound having a property of enhancing mold releasability into the rubber composition serving as the material for the sealing member for a fuel cell.

The present disclosure has been made in view of such circumstances. A sealing member is provided for a fuel cell, which is excellent in mold releasability while maintaining mechanical properties and settling resistance required of the sealing member without impairing adhesiveness to a constituent member of a fuel cell.

According to one aspect of the present disclosure, there is provided a sealing member for a fuel cell to be used for sealing a constituent member of a fuel cell, the sealing member including a cross-linked product of a rubber composition containing the following components (A) to (C):

(A) at least one rubber component selected from the group consisting of an ethylene-propylene rubber, an ethylene-propylene-diene rubber, and an ethylene-butene-diene rubber;

(B) a cross-linking agent including an organic peroxide; and (C) at least one selected from the group consisting of a fatty acid potassium and a fatty acid sodium.

The inventors have made investigations on using, as a rubber component of a sealing member for a fuel cell, a rubber component that exhibits excellent properties, such as an ethylene-propylene rubber, an ethylene-propylene-diene rubber, or an ethylene-butene-diene rubber, and using an organic peroxide as a cross-linking agent therefor in order to prevent the inhibition of the power generation of a fuel cell. However, the problem of mold contamination as described above occurs owing to the combination of the specific rubber component and the organic peroxide. In view of this, the inventors have made further studies. As a result, the inventors have found out that when the at least one of the fatty acid potassium or the fatty acid sodium (C) is blended into the rubber composition serving as the material for the sealing member for a fuel cell, mold releasability is improved without the application of a release agent onto the surface of a mold. Besides, reductions in mechanical properties and settling resistance of the sealing member for a fuel cell associated with the blending of the component (C) have been hardly observed, and a problem such as the component (C) adversely affecting the adhesiveness of the sealing member has also been hardly observed.

The sealing member for a fuel cell of the present disclosure includes the cross-linked product of the rubber composition containing: the at least one rubber component selected from the group consisting of the ethylene-propylene rubber, the ethylene-propylene-diene rubber, and the ethylene-butene-diene rubber (A); the cross-linking agent including the organic peroxide (B); and the at least one selected from the group consisting of the fatty acid potassium or the fatty acid sodium (C). Thus, the sealing member for a fuel cell of the present disclosure exhibits an excellent effect on mold releasability while maintaining mechanical properties and settling resistance required of the sealing member without impairing adhesiveness to a constituent member of a fuel cell.

Particularly when the component (C) is only the fatty acid potassium, the sealing member for a fuel cell exhibits a more excellent effect on mold releasability.

In addition, when the content of the component (C) in the rubber composition falls within a range of from 0.5 part by weight to 10 parts by weight with respect to 100 parts by weight of the rubber component (A), the sealing member for a fuel cell exhibits a more excellent effect on mold releasability while maintaining mechanical properties and settling resistance required of the sealing member without impairing adhesiveness to the constituent member of a fuel cell.

In addition, when the sealing member for a fuel cell includes a cross-linked product of a rubber composition containing (D) at least one of a paraffin oil or a poly-α-olefin compound in addition to the components (A) to (C), bleed-out is suppressed more.

DETAILED DESCRIPTION

Embodiments of the present invention are hereinafter described in detail. However, the present disclosure is not limited to these embodiments.

A sealing member for a fuel cell of the present disclosure (hereinafter sometimes referred to simply as "sealing member") is used for sealing a constituent member of a fuel cell, and as described above, includes a cross-linked product of a rubber composition containing the following components (A) to (C):
(A) at least one rubber component selected from the group consisting of an ethylene-propylene rubber, an ethylene-propylene-diene rubber, and an ethylene-butene-diene rubber;
(B) a cross-linking agent including an organic peroxide; and
(C) at least one of a fatty acid potassium or a fatty acid sodium.

The rubber component (A) is a main component of the rubber composition, and generally accounts for over half of the whole rubber composition. In addition, as described above, as the rubber component (A), the ethylene-propylene rubber (EPM), the ethylene-propylene-diene rubber (EPDM), and the ethylene-butene-diene rubber are used alone or in combination of two or more kinds.

The content of ethylene in the specific rubber component (A) is preferably 60 wt. % or less, particularly preferably 53 wt. % or less, from the viewpoint of improving the sealing property at extremely low temperature. In contrast, when the content of ethylene is too small, the physical properties of the rubber are degraded, and it becomes difficult to ensure elongation characteristics or tensile characteristics required of the sealing member. Therefore, the content of ethylene is preferably 40 wt. % or more.

In addition, from the viewpoints of acid resistance and water resistance of a fuel cell in its operating environment, it is preferred to use the EPDM as the rubber component (A). In particular, as the amount of the diene becomes larger in the EPDM, a cross-linking density in the sealing member, which is a cross-linked product, becomes higher proportionately, resulting in a further improvement in low-temperature sealing property. In view of the foregoing, the amount of the diene in the EPDM (mass ratio of a diene component) falls within a range of preferably from 1 wt. % to 20 wt. %, more preferably from 3 wt. % to 15 wt. %.

A preferred example of the diene component of the EPDM is a diene-based monomer having 5 to 20 carbon atoms. Specific examples thereof include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, and 2-isopropenyl-5-norbornene.

The cross-linking agent (B) of the specific rubber component (A) includes an organic peroxide. Examples of the organic peroxide include a peroxyketal, a peroxyester, a diacyl peroxide, a peroxy dicarbonate, a dialkyl peroxide, and a hydroperoxide. Those organic peroxides are used alone or in combination of two or more kinds. Of those organic peroxides, for example, an organic peroxide having a 1 hour half-life temperature of 160° C. or less is preferably used. In order to bond the sealing member and an electrolyte membrane to each other, an organic peroxide having a 1 hour half-life temperature of 130° C. or less is preferably used. Further, at least one of a peroxyketal or peroxyester having a 1 hour half-life temperature of 100° C. or more is preferred in view of ease of cross-linking at a temperature of about 130° C. and excellent handleability of the rubber composition after kneading having added thereto such cross-linking agent. At least one of a peroxyketal or peroxyester having a 1 hour half-life temperature of 110° C. or more is particularly preferred. In addition, the cross-linking can be accomplished in a shorter time period by using the peroxyester.

In the present disclosure, in relation to the cross-linking agent (B), the "half-life" of the organic peroxide having a 1 hour half-life temperature of 160° C. or less refers to a time period in which the concentration of the organic peroxide (amount of active oxygen) is reduced to half of its initial value. Therefore, the "half-life temperature" is used as an indicator of the decomposition temperature of the organic peroxide. The "1 hour half-life temperature" refers to a temperature at which the half-life becomes 1 hour. That is, as the 1 hour half-life temperature becomes lower, the organic peroxide is decomposed at lower temperature. For example, when the organic peroxide having a 1 hour half-life temperature of 160° C. or less is used, the cross-linking can be accomplished at lower temperature (specifically, 150° C. or less) and in a shorter time period. Therefore, a fuel cell sealed body of the present disclosure can be used even in the vicinity of the electrolyte membrane of a polymer electrolyte fuel cell, for example.

Examples of the peroxyketal include
n-butyl-4,4-di(t-butylperoxy)valerate,
2,2-di(t-butylperoxy)butane,
2,2-di(4,4-di(t-butylperoxy)cyclohexyl)propane,
1,1-di(t-butylperoxy)cyclohexane,
1,1-di(t-hexylperoxy)cyclohexane,
1,1-di(t-hexylperoxy)-3,3,5-trimethylcyclohexane, and
1,1-di(t-butylperoxy)-2-methylcyclohexane.

Examples of the peroxyester include t-butyl peroxybenzoate, t-butyl peroxyacetate, t-hexyl peroxybenzoate, 2,5-dimethyl-2,5-di(benzoylperoxy)hexane, t-butyl peroxy-2-ethylhexyl monocarbonate, t-butyl peroxylaurate, t-butyl peroxyisopropylmonocarbonate, t-butyl peroxy-3,5,5-trimethylhexanoate, t-butyl peroxymaleic acid, and t-hexyl peroxyisopropylmonocarbonate.

Of those, 1,1-di(t-butylperoxy)cyclohexane, t-butyl peroxyacetate, or t-butyl peroxyisopropylmonocarbonate is preferred because of a relatively rapid reaction thereof with the specific rubber component (A). Of those, the cross-linking can be accomplished in a shorter time period by using t-butyl peroxyisopropylmonocarbonate.

The amount of the specific cross-linking agent (B) (in the case of an active ingredient having a purity of 100%) to be blended preferably falls within a range of from 0.4 part by weight to 12 parts by weight with respect to 100 parts by weight of the specific rubber component (A). When the amount of the specific cross-linking agent (B) to be blended is too small, it tends to be difficult to allow a cross-linking reaction to sufficiently proceed. When the amount of the specific cross-linking agent (B) to be blended is too large, there is a tendency that the cross-linking density increases in the cross-linking reaction and thereby elongation is reduced.

In addition to the specific rubber component (A) and cross-linking agent (B), the at least one of the fatty acid potassium or the fatty acid sodium (C) is blended into the rubber composition to be used for the sealing member of the present disclosure. In particular, the component (C) is preferably formed only of the fatty acid potassium because a more excellent effect is exhibited on mold releasability.

The number of carbon atoms of each of the fatty acid potassium and the fatty acid sodium is not particularly limited, but the number of carbon atoms preferably falls within a range of from 8 to 22 from the viewpoint of mold releasability, and the number of carbon atoms more preferably falls within a range of from 12 to 18 from a similar viewpoint. From the viewpoint of mold releasability, the "fatty acid" in each of the fatty acid potassium and the fatty acid sodium may be a saturated fatty acid or may be an unsaturated fatty acid.

Specific examples of the fatty acid potassium include potassium caprylate (C8 saturated fatty acid salt), potassium caprate (C10 saturated fatty acid salt), potassium laurate (C12 saturated fatty acid salt), potassium myristate (C14 saturated fatty acid salt), potassium palmitate (C16 saturated fatty acid salt), potassium stearate (C18 saturated fatty acid salt), potassium oleate (C18 unsaturated fatty acid salt), and potassium behenate (C22 saturated fatty acid salt). One kind thereof may be used alone, or two or more kinds thereof may be used in combination. In addition, specific examples of the fatty acid sodium include sodium caprylate (C8 saturated fatty acid salt), sodium caprate (C10 saturated fatty acid salt), sodium laurate (C12 saturated fatty acid salt), sodium myristate (C14 saturated fatty acid salt), sodium palmitate (C16 saturated fatty acid salt), sodium stearate (C18 saturated fatty acid salt), sodium oleate (C18 unsaturated fatty acid salt), and sodium behenate (C22 saturated fatty acid salt). One kind thereof may be used alone, or two or more kinds thereof may be used in combination. The symbol "C**" represents the number of carbon atoms.

The content of the at least one of the fatty acid potassium or the fatty acid sodium (C) in the rubber composition to be used for the sealing member of the present disclosure falls within a range of preferably from 0.5 part by weight to 10 parts by weight, more preferably from 1 part by weight to 3 parts by weight with respect to 100 parts by weight of the specific rubber component (A). This is because when the content falls within such range, the sealing member exhibits a more excellent effect on mold releasability while maintaining mechanical properties and settling resistance required of the sealing member without impairing adhesiveness to a constituent member of a fuel cell.

In the rubber composition to be used for the sealing member of the present disclosure, there may be blended various additives, such as at least one of a paraffin oil or a poly-α-olefin compound (D), a softening agent (plasticizer), a cross-linking aid, a reinforcing agent, an antioxidant, a tackifier, and a processing aid, in addition to the components (A) to (C).

In addition, in the case of using the poly-α-olefin compound, from the viewpoint of a low-temperature sealing property, its kinematic viscosity at 100° C. is preferably 8 mm$^2$/s or less. Further, from the viewpoint of a low-temperature sealing property, the kinematic viscosity at 100° C. of the poly-α-olefin compound more preferably falls within a range of from 2 mm$^2$/s to 8 mm$^2$/s. The kinematic viscosity of the poly-α-olefin compound is measured in accordance with JIS K 2283.

It is preferred from the viewpoint of the suppression of bleedout that the blending amount of the component (D) be from 5 parts by weight to 40 parts by weight with respect to 100 parts by weight of the specific rubber component (A).

Examples of the softening agent include: a petroleum-based softening agent, such as a process oil, a lubricating oil, or vaseline; a fatty oil-based softening agent, such as a castor oil, a linseed oil, a rapeseed oil, or a coconut oil; a wax, such as a tall oil, factice, beeswax, carnauba wax, or lanolin; linoleic acid; palmitic acid; stearic acid; and lauric acid. Any such softening agent is preferably blended in such an amount that bleedout can be suppressed.

The amount of the softening agent to be blended generally falls within the range of from 5 parts by weight to 40 parts by weight with respect to 100 parts by weight of the specific rubber component (A).

Examples of the cross-linking aid include a maleimide compound, triallyl cyanurate (TAC), triallyl isocyanurate (TAIL), and trimethylolpropane trimethacrylate (TMPT). Those cross-linking aids are used alone or in combination of two or more kinds. Of those, a maleimide compound is preferably used because of its high effects on the improvement of cross-linking density and strength.

The amount of the cross-linking aid to be blended preferably falls within a range of from 0.1 part by weight to 3 parts by weight with respect to 100 parts by weight of the specific rubber component (A). When the amount of the cross-linking aid to be blended is too small, it tends to be difficult to allow the cross-linking reaction to sufficiently proceed. When the amount of the cross-linking aid to be blended is too large, there is a tendency that the cross-linking density excessively increases and thereby the adhesive force is reduced.

Examples of the reinforcing agent include carbon black and silica. The grade of the carbon black is not particularly limited, and may be appropriately selected from, for example, SAF grade, ISAF grade, HAF grade, MAF grade, FEF grade, GPF grade, SRF grade, FT grade, and MT grade.

The amount of the reinforcing agent to be blended falls within a range of generally from 10 parts by weight to 150 parts by weight with respect to 100 parts by weight of the specific rubber component (A).

Examples of the antioxidant include a phenol-based antioxidant, an imidazole-based antioxidant, and a wax. The amount of the antioxidant to be blended falls within a range of generally from 0.5 part by weight to 10 parts by weight with respect to 100 parts by weight of the specific rubber component (A).

<Production of Sealing Member for Fuel Cell>

The sealing member for a fuel cell of the present disclosure may be produced by, for example, preparing the rubber composition containing the components (A) to (C), and as required, various additives, such as the component (D), and then cross-linking the rubber composition. Cross-linking and molding of the sealing member are generally performed in a mold. In the present disclosure, satisfactory mold releasability is expressed without the application of a release agent onto the surface of the mold, but as required, a release agent may be applied.

It is preferred that the sealing member be molded into a predetermined shape corresponding to the shape of a member to be sealed. For example, the sealing member molded into a film shape can be used by being attached to various constituent members of a fuel cell with an adhesive agent. The sealing member of the present disclosure may be used in a mode in which the sealing member is arranged between various constituent members of a fuel cell without being bonded thereto. In addition, as described later, the sealing member of the present disclosure and a constituent member of a fuel cell, such as a MEA or a separator, may be integrally molded in a mold through vulcanization molding (vulcanization bonding) of the sealing member of the present disclosure on a surface having applied thereonto the adhesive agent instead of the attachment (subsequent bonding) of a vulcanization molded product of the sealing member of the present disclosure with the adhesive agent.

<Fuel Cell Sealed Body>

As a fuel cell sealed body of the present disclosure, there is given, for example, a fuel cell sealed body including a constituent member of a fuel cell and a sealing member for sealing the constituent member (sealing member for a fuel cell of the present disclosure) bonded to each other through intermediation of an adhesive layer.

While the constituent member of a fuel cell to be sealed with the sealing member of the present disclosure varies depending on the kind, structure, and the like of the fuel cell, examples of the constituent member include a separator (metal separator or the like), a gas diffusion layer (GDL), and a MEA (an electrolyte membrane, an electrode).

Figure 1:
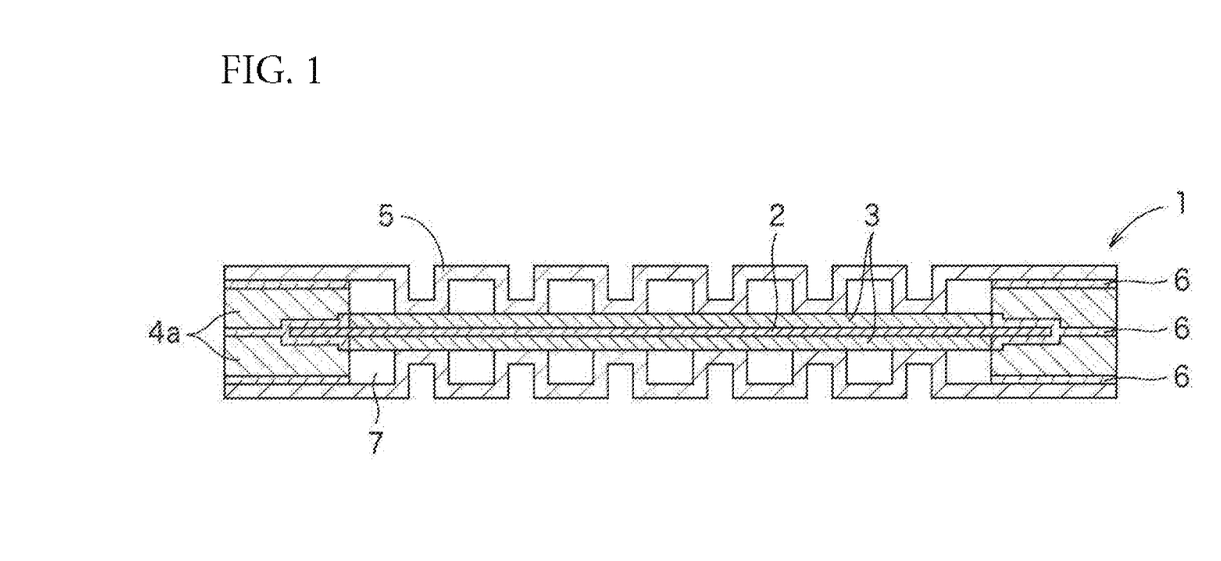
FIG. 1 is a sectional view for illustrating an example of a fuel cell sealed body of the present disclosure.

An example of the fuel cell sealed body of the present disclosure is illustrated in FIG. 1. A single cell 1 in a fuel cell in which a plurality of cells are stacked is mainly illustrated in FIG. 1. The cell 1 includes a MEA 2, gas diffusion layers (GDL) 3, sealing members 4a, separators 5, and adhesive layers 6.

As the fuel cell sealed body of the present disclosure, there are given: for example, the one including the separator 5 and the sealing member 4a bonded to each other through intermediation of the adhesive layer 6 as illustrated in FIG. 1; one including the MEA 2 and the sealing member 4a bonded to each other through intermediation of the adhesive layer 6; one including the gas diffusion layer 3 and the sealing member 4a bonded to each other through intermediation of the adhesive layer 6; and one including the adjacent sealing members 4a bonded to each other through intermediation of the adhesive layer 6.

The MEA 2 includes an electrolyte membrane and a pair of electrodes arranged on both sides of the electrolyte membrane in a stacking direction so as to sandwich the electrolyte membrane (not shown). The electrolyte membrane and the pair of electrodes each have a rectangular thin plate shape. The gas diffusion layers 3 are arranged on both sides of the MEA 2 in the stacking direction so as to sandwich the MEA 2. The gas diffusion layers 3 are each a porous layer having a rectangular thin plate shape.

It is preferred that each of the separators 5 be made of a metal, such as titanium. The separator 5 is particularly preferably a metal separator including a carbon thin film, such as a diamond like carbon film (DLC film) or a graphite film, from the viewpoint of conduction reliability. The separator 5 has a rectangular thin plate shape, and includes a total of six concave grooves each extending in a longitudinal direction. The separator 5 has a section of concave-convex shape by virtue of the grooves. The separators 5 are arranged on both sides of the gas diffusion layers 3 in the stacking direction so as to face each other. Gas flow passages 7 for supplying gases to the electrodes are defied by the gas diffusion layer 3 and the separator 5 by utilizing the concave-convex shape.

Each of the sealing members 4a has a rectangular frame shape. Through intermediation of the adhesive layer 6, the sealing member 4a is bonded to peripheral portions of the MEA 2 and the gas diffusion layer 3, and the separator 5. Thus, the sealing member 4a seals the peripheral portions of the MEA 2 and the gas diffusion layer 3. While two pieces of the sealing members 4a separated into an upper one and a lower one are used in the example of FIG. 1, a single sealing member in which the two sealing members are combined may be used.

At the time of operation of a fuel cell, such as a polymer electrolyte fuel cell, a fuel gas and an oxidant gas are supplied through the gas flow passages 7. In this case, the peripheral portion of the MEA 2 is sealed with the sealing member 4a through intermediation of the adhesive layer 6. Therefore, the gases are prevented from being mixed with each other or leaking out.

For example, the fuel cell sealed body of the present disclosure may be produced as described below. First, the sealing member for a fuel cell of the present disclosure is produced as described above.

Next, a material (adhesive agent) for forming the adhesive layer is applied onto any one or both of the constituent members of a fuel cell, such as a metal separator, and the sealing member for sealing the constituent member. Thus, the fuel cell sealed body of the present disclosure including the constituent member of a fuel cell, such as a metal separator, and the sealing member bonded to each other through intermediation of the adhesive layer can be obtained.

As the material (adhesive agent) for forming the adhesive layer, for example, rubber cement, a rubber composition in a liquid format room temperature (23° C.), or a primer is used. As the rubber composition in a liquid form, there is given a rubber composition containing a rubber component, an organic peroxide (cross-linking agent), and the like. An example of the rubber component is a rubber in a liquid form, and specifically, a liquid EPM, a liquid EPDM, a liquid acrylonitrile-butadiene rubber (liquid NBR), a liquid hydrogenated acrylonitrile-butadiene rubber (liquid H-NBR), and the like are used alone or in combination of two or more kinds. As the primer, there is given, for example, a primer containing a copolymerized oligomer of an amino group-containing silane coupling agent and a vinyl group-containing silane coupling agent.

As a method of applying the material for forming the adhesive layer, there is given, for example, an application method involving using a dispenser. The material for forming the adhesive layer may be generally applied under conditions of room temperature.

The thickness of the adhesive layer in the fuel cell sealed body of the present disclosure is generally from 0.01 mm to 0.5 mm, preferably from 0.05 mm to 0.3 mm, in the case of using the rubber composition in a liquid form. Alternatively, in the case of using the primer, the thickness of the adhesive layer's generally from 10 nm to 500 nm, preferably from 30 nm to 200 nm.

In addition, when the fuel cell sealed body is to be manufactured by integrating the constituent member of a fuel cell and the sealing member through vulcanization bonding of the sealing member, the manufacture may be performed as described below. That is, there may be adopted a manufacturing method involving placing the constituent member of a fuel cell having formed thereon the adhesive layer in a mold for molding of the sealing member, and cross-linking and molding the rubber composition for forming the sealing member in a state of being brought into contact with the constituent member of a fuel cell in the mold.

Figure 2:
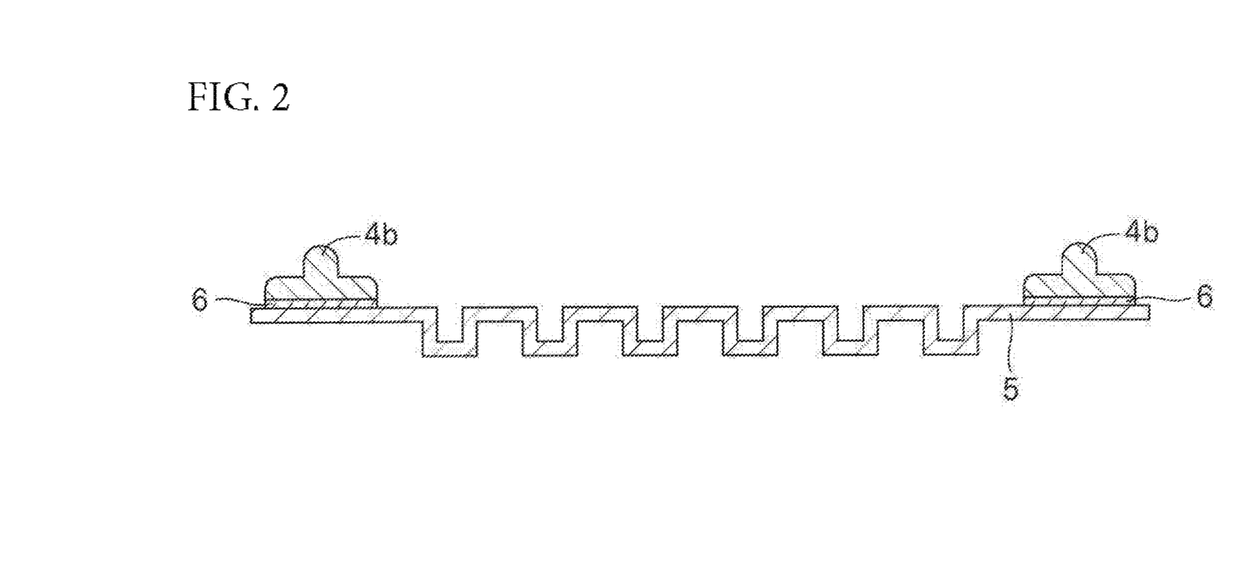
FIG. 2 is a sectional view for illustrating an example of using a sealing member for a fuel cell of the present disclosure.

Further, another example of using the sealing member for a fuel cell of the present disclosure is illustrated in FIG. 2. FIG. 2 is an illustration of a member including: the separator 5 described above, which includes a total of six concave grooves each extending in the longitudinal direction and has a rectangular thin plate shape with a section of concave-convex shape; and a lip 4b having a rectangular shape with a section of convex shape, arranged in a peripheral portion of the separator 5 through intermediation of the adhesive layer 6. The sealing member for a fuel cell of the present disclosure is used as the lip 4b. A material for forming the separator 5 and a material for forming the adhesive layer 6 are the same as those described above.

EXAMPLES

Next, Examples are described together with Comparative Examples. However, the present disclosure is not limited to these Examples without departing from the gist of the invention.

First, prior to Examples and Comparative Examples, the following materials were prepared for rubber compositions.

[EPDM (Component A)]
Ethylene-propylene-diene rubber (manufactured by JSR Corporation, EP342)

[EPM (Component A)]
Ethylene-propylene rubber having an ethylene content of 51 wt. % (manufactured by Mitsui Chemicals, Inc., EPT 0045)

[EBT (Component A)]
Ethylene-butene-diene rubber having an ethylene content of 50 wt. % and a diene content of 7.6 wt. % (manufactured by Mitsui Chemicals, Inc., K-4030M)

[Carbon Black]
SEAST 116 manufactured by Tokai Carbon Co., Ltd.

[Paraffin Oil (Component D)]
Sunper 110 manufactured by Japan Sun Oil Company, Ltd.

[PAO (Component D)]
Poly-α-olefin compound having a kinematic viscosity at 100° C. of $8=^2/s$ (manufactured by Chevron Phillips Chemical Company, Synfluid PAO 8 cSt)

[Potassium Caprylate (Component C)]
Potassium caprylate manufactured by NOF Corporation

[Potassium Laurate (Component C)]
NONSAL LK-2 manufactured by NOF Corporation

[Potassium Stearate (Component C)]
NONSAL SK-1 manufactured by NOF Corporation

[Potassium Oleate (Component C)]
NONSAL OK-2 manufactured by NOF Corporation

[Potassium Behenate (Component C)]
Potassium behenate manufactured by NOF Corporation

[Sodium Stearate (Component C)]
NONSAL SN-1 manufactured by NOF Corporation

[Magnesium Stearate]
Magnesium stearate manufactured by NOF Corporation

[Zinc Stearate]
Zinc stearate manufactured by NOF Corporation

[Calcium Stearate]
Calcium stearate manufactured by NOF Corporation

[Peroxide (Component B)]
PERHEXA C-40 manufactured by NOF Corporation

Examples 1 to 12 and Comparative Examples 1 to 7

(Production of Vulcanized Rubber for Sealing Member)

Components shown in Table 1 to Table 5 below were blended at ratios shown in the tables, and kneaded using a Banbury mixer and an open roll. Thus, a rubber composition was prepared. Then, the obtained rubber composition was vulcanized by being retained at 160° C. for 10 minutes. Thus, a vulcanized rubber having a predetermined thickness was produced.

The vulcanized rubbers obtained as described above were evaluated for various characteristics based on the following standards. The results are also shown in Table 1 to Table 5 below.

<Tensile Strength>
The obtained vulcanized rubbers were each used and measured for tensile strength (TS) as described below. Specifically, a JIS No. 5 dumbbell was punched out of the vulcanized rubber, and measured for tensile strength (MPa) in accordance with JIS K 6251.

In Table 1 and Table 2, the tensile strength of each vulcanized rubber is shown as an index based on the tensile strength of the vulcanized rubber of Comparative Example 1 as a benchmark (100). In addition, in Table 3, the tensile strength of each vulcanized rubber is shown as an index based on the tensile strength of the vulcanized rubber of Comparative Example 5 as a benchmark (100). In addition, in Table 4, the tensile strength of each vulcanized rubber is shown as an index based on the tensile strength of the vulcanized rubber of Comparative Example 6 as a benchmark (100). In addition, in Table 5, the tensile strength of each vulcanized rubber is shown as an index based on the tensile strength of the vulcanized rubber of Comparative Example 7 as a benchmark (100).

That is, the index of the tensile strength was calculated by the following equation.

$$\text{Index of tensile strength} = (\text{Tensile strength of each vulcanized rubber (MPa)})/(\text{Tensile strength of vulcanized rubber serving as benchmark (MPa)}) \times 100$$

In Table 1 to Table 5 below, a case where the index of the tensile strength was 90 or more was evaluated as "○".

<Elongation at Break>

The obtained vulcanized rubbers were each used and measured for elongation at break (Eb) as described below. Specifically, a JIS No. 5 dumbbell was punched out of the vulcanized rubber, and measured for elongation at break (%) in accordance with JIS K 6251.

In Table 1 and Table 2, the elongation at break of each vulcanized rubber is shown as an index based on the elongation at break of the vulcanized rubber of Comparative Example 1 as a benchmark (100). In addition, in Table 3, the elongation at break of each vulcanized rubber is shown as an index based on the elongation at break of the vulcanized rubber of Comparative Example 5 as a benchmark (100). In addition, in Table 4, the elongation at break of each vulcanized rubber is shown as an index based on the elongation at break of the vulcanized rubber of Comparative Example 6 as a benchmark (100). In addition, in Table 5, the elongation at break of each vulcanized rubber is shown as an index based on the elongation at break of the vulcanized rubber of Comparative Example 7 as a benchmark (100).

That is, the index of the elongation at break was calculated by the following equation.

$$\text{Index of elongation at break} = (\text{Elongation at break of each vulcanized rubber (\%)})/(\text{Elongation at break of vulcanized rubber serving as benchmark (\%)}) \times 100$$

In Table 1 to Table 5 below, a case where the index of the elongation at break was 90 or more was evaluated as "○".

<Compression Set>

The obtained vulcanized rubbers were each subjected to a compression set test at high temperature in accordance with JIS K 6262. That is, the vulcanized rubber was compressed at a compression rate of 25%, heated at 150° C. for 24 hours in the compressed state, and then released. After a lapse of 30 minutes under room temperature (25° C.), the thickness of the vulcanized rubber was measured, and a compression set (%) was calculated.

In Table 1 and Table 2, the compression set of each vulcanized rubber is shown as an index based on the compression set of the vulcanized rubber of Comparative Example 1 as a benchmark (100). In addition, in Table 3, the compression set of each vulcanized rubber is shown as an index based on the compression set of the vulcanized rubber of Comparative Example 5 as a benchmark (100). In addition, in Table 4, the compression set of each vulcanized rubber is shown as an index based on the compression set of the vulcanized rubber of Comparative Example 6 as a benchmark (100). In addition, in Table 5, the compression set of each vulcanized rubber is shown as an index based on the compression set of the vulcanized rubber of Comparative Example 7 as a benchmark (100). That is, the index of the compression set was calculated by the following equation.

$$\text{Index of compression set} = (\text{Compression set of each vulcanized rubber (\%)})/(\text{Compression set of vulcanized rubber serving as benchmark (\%)}) \times 100$$

In Table 1 to Table 5 below, a case where the index of the compression set was 110 or less was evaluated as "○", and a case where the index of the compression set was more than 110 was evaluated as "×".

<Releasing Force>

A plate made of iron was prepared as a substitute for a mold, and the rubber composition for forming the vulcanized rubber was vulcanized (160° C.×10 min) on the plate to produce a sample (vulcanized rubber) measuring 25 mm wide by 5 mm thick. Then, in accordance with JIS K 6256-2, the vulcanized rubber was pulled to be peeled off at an angle of 90° under a state in which the plate was fixed, and the maximum strength (N) of its releasing force was measured.

In Table 1 and Table 2, the maximum strength of the releasing force of each vulcanized rubber is shown as an index based on the maximum strength of the releasing force of the vulcanized rubber of Comparative Example 1 as a benchmark (100). In addition, in Table 3, the maximum strength of the releasing force of each vulcanized rubber is shown as an index based on the maximum strength of the releasing force of the vulcanized rubber of Comparative Example 5 as a benchmark (100). In addition, in Table 4, the maximum strength of the releasing force of each vulcanized rubber is shown as an index based on the maximum strength of the releasing force of the vulcanized rubber of Comparative Example 6 as a benchmark (100). In addition, in Table 5, the maximum strength of the releasing force of each vulcanized rubber is shown as an index based on the maximum strength of the releasing force of the vulcanized rubber of Comparative Example 7 as a benchmark (100).

That is, the index of the maximum strength of the releasing force was calculated by the following equation.

$$\text{Index of releasing force} = (\text{Maximum strength of releasing force of each vulcanized rubber (N)})/(\text{Maximum strength of releasing force of vulcanized rubber serving as benchmark (N)}) \times 100$$

In Table 1 to Table 5 below, a case where the index of the releasing force was less than 90 was evaluated as "○", and a case where the index of the releasing force was 90 or more was evaluated as "×".

<Adhesiveness>

A plate made of iron was prepared as a substitute for a separator, and a primer was applied (25 mm×25 mm square) onto the plate, and further thereon, the rubber composition for forming the vulcanized rubber was vulcanized (160° C.×10 min) to produce a sample (vulcanized rubber) measuring 25 mm wide by 5 mm thick. Then, in accordance with JIS K 6256-2, the vulcanized rubber was pulled to be peeled off at an angle of 90° under a state in which the plate was fixed. Then, a case where the vulcanized rubber was fractured at the time of the peeling was evaluated as "○", and a case where the vulcanized rubber and the plate made of iron were peeled from each other at their interface was evaluated as "×".

<<Overall Evaluation>>

A case where each of all the above-mentioned properties was evaluated as "○" was given an overall evaluation "○", and a case where at least one of the properties was evaluated as "×" was given an overall evaluation "×".

TABLE 1

| | Example | | | | | | | | | (Part(s) by weight) |
|---|---|---|---|---|---|---|---|---|---|---|
| | 1 | 2 | 3 | 4 | 5 | 6 | 7 | 8 | 9 | |
| EPDM | 100 | 100 | 100 | 100 | 100 | 100 | 100 | 100 | 100 | |
| EBM | — | — | — | — | — | — | — | — | — | |
| EBT | — | — | — | — | — | — | — | — | — | |
| Carbon black | 50 | 50 | 50 | 50 | 50 | 50 | 50 | 50 | 50 | |
| Paraffin oil | 15 | 15 | 15 | 15 | 15 | 15 | 15 | 15 | 15 | |
| PAO | — | — | — | — | — | — | — | — | — | |
| Potassium caprylate | 3 | — | — | — | — | — | — | — | — | |
| Potassium laurate | — | 3 | — | — | — | — | — | — | — | |
| Potassium stearate | — | — | 3 | — | — | 0.5 | 5 | 10 | — | |
| Potassium oleate | — | — | — | 3 | — | — | — | — | — | |
| Potassium behenate | — | — | — | — | 3 | — | — | — | — | |
| Sodium stearate | — | — | — | — | — | — | — | — | 3 | |
| Magnesium stearate | — | — | — | — | — | — | — | — | — | |
| Zinc stearate | — | — | — | — | — | — | — | — | — | |
| Calcium stearate | — | — | — | — | — | — | — | — | — | |
| Peroxide | 7 | 7 | 7 | 7 | 7 | 7 | 7 | 7 | 7 | |
| Tensile strength (index) | 98 | 100 | 95 | 96 | 95 | 100 | 96 | 91 | 100 | |
| (evaluation) | ○ | ○ | ○ | ○ | ○ | ○ | ○ | ○ | ○ | |
| Elongation at break (index) | 105 | 108 | 100 | 110 | 100 | 100 | 105 | 110 | 105 | |
| (evaluation) | ○ | ○ | ○ | ○ | ○ | ○ | ○ | ○ | ○ | |
| Compression set (index) | 104 | 104 | 100 | 104 | 104 | 100 | 104 | 108 | 104 | |
| (evaluation) | ○ | ○ | ○ | ○ | ○ | ○ | ○ | ○ | ○ | |
| Releasing force (index) | 19 | 16 | 20 | 28 | 25 | 50 | 18 | 16 | 50 | |
| (evaluation) | ○ | ○ | ○ | ○ | ○ | ○ | ○ | ○ | ○ | |
| Adhesiveness (index) | ○ | ○ | ○ | ○ | ○ | ○ | ○ | ○ | ○ | |
| Overall evaluation | ○ | ○ | ○ | ○ | ○ | ○ | ○ | ○ | ○ | |

TABLE 2

| | Comparative Example | | | | (Part(s) by weight) |
|---|---|---|---|---|---|
| | 1 | 2 | 3 | 4 | |
| EPDM | 100 | 100 | 100 | 100 | |
| EPM | — | — | — | — | |
| EBT | — | — | — | — | |
| Carbon black | 50 | 50 | 50 | 50 | |
| Paraffin oil | 15 | 15 | 15 | 15 | |
| PAO | — | — | — | — | |
| Potassium caprylate | — | — | — | — | |
| Potassium laurate | — | — | — | — | |
| Potassium stearate | — | — | — | — | |
| Potassium oleate | — | — | — | — | |
| Potassium behenate | — | — | — | — | |
| Sodium stearate | — | — | — | — | |
| Magnesium stearate | — | 3 | — | — | |
| Zinc stearate | — | — | 3 | — | |
| Calcium stearate | — | — | — | 3 | |
| Peroxide | 7 | 7 | 7 | 7 | |
| Tensile strength (index) | 100 | 98 | 96 | 91 | |
| (evaluation) | ○ | ○ | ○ | ○ | |
| Elongation at break (index) | 100 | 105 | 115 | 100 | |
| (evaluation) | ○ | ○ | ○ | ○ | |
| Compression set (index) | 100 | 108 | 116 | 120 | |
| (evaluation) | ○ | ○ | x | x | |
| Releasing force (index) | 100 | 98 | 225 | 110 | |
| (evaluation) | x | x | x | x | |
| Adhesiveness (index) | ○ | x | ○ | ○ | |
| Overall evaluation | x | x | x | x | |

TABLE 3

| | Example 10 | Comparative Example 5 | (Part(s) by Weight) |
|---|---|---|---|
| EPDM | 100 | 100 | |
| EPM | — | — | |
| EBT | — | — | |
| Carbon black | 50 | 50 | |
| Paraffin oil | — | — | |
| PAO | 15 | 15 | |
| Potassium caprylate | — | — | |
| Potassium laurate | — | — | |
| Potassium stearate | 3 | — | |
| Potassium oleate | — | — | |
| Potassium behenate | — | — | |
| Sodium stearate | — | — | |
| Magnesium stearate | — | — | |
| Zinc stearate | — | — | |
| Calcium stearate | — | — | |
| Peroxide | 7 | 7 | |
| Tensile strength (index) | 96 | 100 | |
| (evaluation) | ○ | ○ | |
| Elongation at break (index) | 105 | 100 | |
| (evaluation) | ○ | ○ | |
| Compression set (index) | 104 | 100 | |
| (evaluation) | ○ | ○ | |
| Releasing force (index) | 18 | 100 | |
| (evaluation) | ○ | x | |
| Adhesiveness (index) | ○ | ○ | |
| Overall evaluation | ○ | x | |

TABLE 4

| | Example 11 | Comparative Example 6 | (Part(s) by Weight) |
|---|---|---|---|
| EPDM | — | — | |
| EPM | 100 | 100 | |
| EBT | — | — | |
| Carbon black | 50 | 50 | |

TABLE 4-continued

|  | (Part(s) by Weight) | |
| --- | --- | --- |
|  | Example 11 | Comparative Example 6 |
| Paraffin oil | 15 | 15 |
| PAO | — | — |
| Potassium caprylate | — | — |
| Potassium laurate | — | — |
| Potassium stearate | — | — |
| Potassium oleate | — | — |
| Potassium behenate | — | — |
| Sodium stearate | — | — |
| Magnesium stearate | — | — |
| Zinc stearate | — | — |
| Calcium stearate | — | — |
| Peroxide | 7 | 7 |
| Tensile strength (index) | 100 | 100 |
| (evaluation) | ○ | ○ |
| Elongation at break (index) | 105 | 100 |
| (evaluation) | ○ | ○ |
| Compression set (index) | 104 | 100 |
| (evaluation) | ○ | ○ |
| Releasing force (index) | 22 | 100 |
| (evaluation) | ○ | × |
| Adhesiveness (index) | ○ | ○ |
| Overall evaluation | ○ | × |

TABLE 5

|  | (Part(s) by Weight) | |
| --- | --- | --- |
|  | Example 12 | Comparative Example 7 |
| EPDM | — | — |
| EPM | — | — |
| EBT | 100 | 100 |
| Carbon black | 50 | 50 |
| Paraffin oil | 15 | 15 |
| PAO | — | — |
| Potassium caprylate | — | — |
| Potassium laurate | — | — |
| Potassium stearate | 3 | — |
| Potassium oleate | — | — |
| Potassium behenate | — | — |
| Sodium stearate | — | — |
| Magnesium stearate | — | — |
| Zinc stearate | — | — |
| Calcium stearate | — | — |
| Peroxide | 7 | 7 |
| Tensile strength (index) | 98 | 100 |
| (evaluation) | ○ | ○ |
| Elongation at break (index) | 105 | 100 |
| (evaluation) | ○ | ○ |
| Compression set (index) | 108 | 100 |
| (evaluation) | ○ | ○ |
| Releasing force (index) | 25 | 100 |
| (evaluation) | ○ | × |
| Adhesiveness (index) | ○ | ○ |
| Overall evaluation | ○ | × |

As is apparent from the results shown in Table 1 and Table 2, each of the vulcanized rubbers (sealing members) of Examples uses EPDM as a polymer, is cross-linked with a peroxide (organic peroxide), and further contains a fatty acid potassium or a fatty acid sodium in its material. Accordingly, each of those vulcanized rubbers is satisfactory in terms of compression set (settling resistance) while maintaining the mechanical properties (TS and Eb), and moreover, has small releasing force, and hence is found to be able to eliminate the problem in mold releasability. Besides, the adhesiveness when the primer is used is also satisfactory.

In contrast, the vulcanized rubber (sealing member) of Comparative Example 1 uses EPDM as a polymer and is cross-linked with a peroxide (organic peroxide), but does not contain a fatty acid potassium or a fatty acid sodium in its material and has large releasing force. Accordingly, the problem in mold releasability occurred.

Each of the vulcanized rubbers (sealing members) of Comparative Examples 2 to 4 also uses EPDM as a polymer and is cross-linked with a peroxide (organic peroxide), but contains magnesium stearate, zinc stearate, calcium stearate, or the like instead of a fatty acid potassium or a fatty acid sodium in its material. In addition, in each of those cases, the problem in mold releasability occurred owing to large releasing force. In addition, in Comparative Example 2, owing to bleedout of magnesium stearate, satisfactory adhesiveness was not obtained even when the primer was used. In each of Comparative Examples 3 and 4, the result of the compression set (settling resistance) evaluation was also poor.

As is apparent from the results shown in Table 3, even in the case of using the PAO instead of the paraffin oil as the oil serving as the component (D), evaluation results at substantially the same levels as those of the results shown in Table 1 and Table 2 were obtained.

In addition, as is apparent from the results shown in Table 4, even in the case of using the EPM instead of the EPDM in the rubber composition serving as the material for forming the sealing member, evaluation results at substantially the same levels as those of the results shown in Table 1 and Table 2 were obtained.

In addition, as is apparent from the results shown in Table 5, even in the case of using the ethylene-butene-diene rubber instead of the EPDM in the rubber composition serving as the material for forming the sealing member, evaluation results at substantially the same levels as those of the results shown in Table 1 and Table 2 were obtained.

The sealing member for a fuel cell of the present disclosure is used in a fuel cell sealed body as a rubber sealing member for sealing a constituent member of a fuel cell, such as a metal separator, the fuel cell sealed body including the constituent member and the sealing member bonded to each other through intermediation of an adhesive layer, or including the sealing members bonded to each other through intermediation of an adhesive layer.

Although specific forms of embodiments of the present invention have been described above and illustrated in the accompanying drawings in order to be more clearly understood, the above description is made byway of example and not as a limitation to the scope of the present invention. It is contemplated that various modifications apparent to one of ordinary skill in the art could be made without departing from the scope of the invention.

The invention claimed is:
1. A sealing member for a fuel cell, comprising:
   a cross-linked product of a rubber composition comprising the following component (A) as a main component and the following components (B) and (C):
   (A) an ethylene-butene-diene rubber having an ethylene content of 60 wt. % or less;
   (B) a cross-linking agent comprising an organic peroxide; and
   (C) at least one selected from the group consisting of a fatty acid potassium and a fatty acid sodium,
   wherein the rubber composition has a content of the component (B) falling within a range of from 0.4 part by weight to 12 parts by weight with respect to 100 parts by weight of the component (A), and
   wherein the rubber composition has a content of the component (C) falling within a range of from 0.5 part by weight to 10 parts by weight with respect to 100 parts by weight of the rubber component (A).

2. The sealing member for a fuel cell according to claim 1, wherein the component (C) is only the fatty acid potassium.

3. The sealing member for a fuel cell according to claim 1, wherein the rubber composition further comprises the following component (D):
- (D) at least one of a paraffin oil or a poly-α-olefin compound.

4. The sealing member for a fuel cell according to claim 1, wherein the cross-linking agent (B) comprises at least one selected from the group consisting of a peroxyketal, a peroxyester, a diacyl peroxide, a peroxydicarbonate, a dialkyl peroxide, and a hydroperoxide.

5. The sealing member for a fuel cell according to claim 1, wherein the at least one selected from the group consisting of the fatty acid potassium and the fatty acid sodium (C) has a number of carbon atoms falling within a range of from 8 to 22.

6. The sealing member for a fuel cell according to claim 1, wherein the fatty acid potassium comprises at least one selected from the group consisting of potassium caprylate, potassium caprate, potassium laurate, potassium myristate, potassium palmitate, potassium stearate, potassium oleate, and potassium behenate.

7. The sealing member for a fuel cell according to claim 1, wherein the fatty acid sodium comprises at least one selected from the group consisting of sodium caprylate, caprate sodium, sodium laurate, sodium myristate, sodium palmitate, stearate sodium, sodium oleate, and sodium behenate.

8. The sealing member for a fuel cell according to claim 3,
wherein (D) comprises at least the poly-α-olefin compound, and
wherein the poly-α-olefin compound has a kinematic viscosity at 100° C. of 8 mm$^2$/s or less.

9. The sealing member for a fuel cell according to claim 1, wherein a rubber component of the rubber composition consists of ethylene-butene-diene rubber.

10. The sealing member for a fuel cell according to claim 1, wherein the rubber composition has a compression set index of less than 110 as compared to a standard rubber composition having a compression set index of 100, the standard rubber composition being identical to the rubber composition except for lacking the (C) at least one selected from the group consisting of a fatty acid potassium and a fatty acid sodium.

* * * * *